(12) United States Patent
Baradat et al.

(10) Patent No.: US 8,668,034 B2
(45) Date of Patent: Mar. 11, 2014

(54) SELF-RECONFIGURABLE MOBILE MANIPULATOR

(75) Inventors: Cédric Baradat, Montpellier Cedex (FR); Hai Yang, Montpellier Cedex (FR); François Pierrot, Paris cedex (FR); Sébastien Krut, Paris cedex (FR); Agustin Saenz, Montpellier Cedex (FR)

(73) Assignees: Tecnalia France (FR); Centre National de la Recherche Scientifique (FR)

( * ) Notice: Subject to any disclaimer, the term of this patent is extended or adjusted under 35 U.S.C. 154(b) by 0 days.

(21) Appl. No.: 13/880,137

(22) PCT Filed: Oct. 18, 2010

(86) PCT No.: PCT/EP2010/065630
§ 371 (c)(1),
(2), (4) Date: Aug. 9, 2013

(87) PCT Pub. No.: WO2012/052048
PCT Pub. Date: Apr. 26, 2012

(65) Prior Publication Data
US 2013/0306384 A1  Nov. 21, 2013

(51) Int. Cl.
*B62D 57/00* (2006.01)
(52) U.S. Cl.
USPC ............................. 180/8.5; 180/8.6
(58) Field of Classification Search
USPC .................. 180/8.1, 8.2, 8.4, 8.5, 8.6; 901/15
See application file for complete search history.

(56) References Cited

U.S. PATENT DOCUMENTS 5,987,726 A    11/1999   Akeel

FOREIGN PATENT DOCUMENTS

FR        2809034 A1    11/2001

OTHER PUBLICATIONS

International Search Report for corresponding application PCT/EP2010/065630 filed Oct. 18, 2010; Mail date Jun. 21, 2011.
International Preliminary Report on Patentability for corresponding application PCT/EP2010/065630 filed Oct. 18, 2010; Mail date Oct. 12, 2012.

*Primary Examiner* — Kevin Hurley
*Assistant Examiner* — Marc A Scharich
(74) *Attorney, Agent, or Firm* — Cantor Colburn LLP

(57) ABSTRACT

A manipulator including a mobile plate for carrying an end-effector, connected to a plurality of legs, each of which has a distal end connected to the mobile plate and a proximal end connected to a supporting object by a clamping device, a plurality of distal links, a plurality of intermediate links and a plurality of proximal links, an actuator connected between each pair of longitudinally adjacent intermediate links, the distal links, connecting the intermediate links with the mobile plate by a system of distal revolute joints including a distal lockable joint, and the proximal links, connecting the intermediate links with a system of proximal joints having lockable proximal joints, where the manipulator is able to achieve manipulation, self-reconfiguration and locomotion movements without needing actuators directly acting on each joint.

17 Claims, 7 Drawing Sheets

SELF-RECONFIGURABLE MOBILE MANIPULATOR

TECHNICAL FIELD OF THE INVENTION

The present invention lies within the technical field of robotics and, particularly, it is related to devices and systems for the manipulation of objects, such as positioning and holding of an object A relative to a second object B, in order to carry out one or more operations in large workspaces, and is particularly useful in but not exclusively limited to manufacturing processes.

BACKGROUND OF THE INVENTION

Industries like aeronautic industry, shipbuilding industry and train manufacturing industry are dealing with large workpieces. In such industries, and also in manufacturing industry in general, it is common to carry out manufacturing operations as measuring, drilling, milling, cutting, inspecting, fixing.

End-effectors for such operations are well known in the art and form no part of the present invention; however the term "end-effector" as used hereinafter should be understood to embrace all such apparatus for performing any such operation.

The term "manipulation" as used hereinafter should be understood to embrace all such operations for holding, positioning end-effectors to required positions with required orientations.

To automate those operations for large workpiece, systems are required to be able to have following properties:
  Good rigidity and accuracy at any operation location
  Large workspace
  Reconfigurable workspace Flight simulators such as the Stewart platform [Stewart D., "A platform with six degrees of freedom," in Proc. Institute of Mechanical Engr., pp. 371-386, vol. 180, 1965] have been used and studied as parallel manipulators. Based on parallel mechanisms, various manipulators with 6 degrees of freedom (DOFs), 5 DOFs, 4 DOFs, 3 DOFs and 2 DOFs are proposed.

These families of manipulators can be described as two platforms (a mobile plate and a fixed plate) connected by several kinematic chains which hereinafter will be referred to as legs of parallel manipulators. With certain joints within these legs being actuated, the mobile plate can be moved with certain degrees of freedom with respect to the fixed plate. They are proposed in order to build manipulators with good rigidity and/or good accuracy.

However, most of the parallel manipulators have limited workspace. Once the dimensions of the components of parallel manipulators are determined, the movement of the mobile plate regarding the fixed plate is limited to its predefined workspace. In prior art, the following solutions have been proposed to overcome such drawbacks:
  Parallel manipulators made reconfigurable in order to form machines with different workspaces [Xi, Fengeng, Xu, Yuonan, Xiong, Guolian. "Design and analysis of a reconfigurable parallel robot", Mechanisms and Machine Theory, pp. 191-211, vol 41, 12, 2006].
  Parallel manipulators made transportable, for example, as those disclosed in the U.S. Pat. No. 5,987,726. They can be installed on different locations such as floors, fixtures etc.
  For obtaining larger workspaces, parallel manipulators are installed on various mobile platforms such as: the guide based system [Pekka Pessi, "Novel robot solutions for carrying out field joint welding and machining in the assembly of the vacuum vessel of ITER", Ph.D. Thesis, Lappeenranta University of technology, Finland 2009].

The reconfiguration of reconfigurable parallel manipulators in prior art requires a lot of machine down time. Changing the work location of the transportable parallel manipulators is also a very time-consuming process. Putting parallel manipulators on another mobile device such as wheeled, tracked and legged systems, represents additional components and controls of the locomotion system. Building guides with high stiffness and accuracy in a long distance represents tedious civil works and very high costs.

One of the specificities of parallel robots (and some serial robots that include closed kinematic chains) is the presence of passive joints in addition to a plurality of legs which connect a mobile plate to a fixed plate. Because the plurality legs forms the closed kinematic chains which impose kinematic constrains to the systems, there is no need to actuate every joint of such robots. The presence of the pivotal joints helps to build robots with relatively higher efficiency regarding to robots with all joints actuated. As a plurality of legs may enforce the rigidity as well as other properties of a robot, parallel robots attract more and more intentions for manufacturing applications.

However, with a plurality of legs connecting the mobile plate and the fixed plate, the volume of the robot's workspace is penalized severely. To enlarge workspace, conventional parallel manipulators are mounted on another mobile platform such as wheeled robots, tracked robots and legged robots. This involves extra actuators and control means of the mobile platform to the systems. When long guides are built to enlarge the workspace of parallel manipulators, high rigidity of the guides is required in order to minimize the vibrations and deflections and to increase the positioning accuracy. This leads to tedious civil works and less flexibility for production.

DESCRIPTION OF THE INVENTION

The present invention is intended to overcome the afore mentioned drawbacks of prior art by providing a self-reconfigurable mobile manipulator which is able to achieve manipulation, self-reconfiguration and locomotion movement comprising a mobile plate suitable for carrying an object, and a plurality of legs each having a distal end connected to the said mobile plate and a proximal end connected to a support; each leg comprising at least one actuator interconnected between said mobile plate and the supporting object, wherein
  each leg comprises a plurality of links, and is connectable to a clamping device at its proximal end for connecting the leg to the support which is a clamping area of a supporting object;
  each actuator is interconnected between respective proximal end portions of a distal intermediate link and respective distal end portions of a proximal intermediate link, said distal intermediate link comprising distal end portions articulatedly connected to the mobile plate through at least one distal articulated joint, and said proximal intermediate link comprising proximal end portions articulatedly connected to one of the clamping devices through at least one proximal articulated joint;
  said articulated joints comprise a distal lockable joint system arranged between said actuator and said mobile plate, and a proximal lockable joint system arranged between said actuator and said clamping device; said lockable joint systems being arranged to immobilize the leg in predetermined positions achieved by the action of said actuators.

The terms "proximal" and "distal" as used herein respectively mean "closest to the supporting object" and "distanced from the supporting and closest to the mobile plate".

As apparent, each leg is a kinematic chain which connects the clamping device with the mobile plate. The object carried by the mobile plate is at least one end-effector with articulated or unarticulated kinematic chain. The end-effector may be, for example, at least one tool selected from tools for measuring, inspecting, painting, shape forming, assembling and other manufacturing processes as required.

Preferably, the manipulator comprises at least three legs. Also preferably, the distal end of each leg is fixed to a side portion of the mobile plate.

The manipulator of this invention provides a manipulator for an automation system which can achieve manipulation, self-reconfiguration and locomotion tasks. Compared to prior parallel manipulators, the present invention has the following advantages:

The present invention is capable to achieve self-reconfiguration in order to obtain workspaces with different shapes and force properties.

It is capable to achieve locomotion movement in order to obtain a workspace at different locations.

There is less civil works required than in guide-based solutions.

The number of actuators for achieving locomotion is less than the conventional legged robots thanks to the use of locking devices in some articulated joints.

According to the present invention, the clamping device may be, depending on the use of the manipulator, for example a mechanical clamping device, a vacuum clamping system or an electromagnetic clamping system. The clamping targets are on the supporting object which could be floors, ceilings, fixtures, workpieces, etc. When legs are attached to the supporting object, the clamping targets form a supporting pattern.

The clamping device and the clamping target are two parts of a clamping system. Another possible configuration of the clamping systems (not discussed as an example in the description) is that the clamping device is fixed to the supporting object and the clamping target is at the second end of each leg.

In a preferred embodiment, the articulated joints are pivotal joints, and in each leg, a first distal link is fixedly connected by its distal end to the mobile plate and by its proximal end to a first distal pivotal joint located on an intermediate portion of a pivotal second distal link which is transverse to the first distal link, and a left distal intermediate link is pivotally connected by its distal end portion to a left end portion of the second distal link by means of a left distal pivotal joint fixed to the second distal link, and fixedly connected by its proximal end portion to a left actuator.

A right distal intermediate link is pivotally connected by its distal end portion to a right end portion of the second distal link by means of a right distal pivotal joint fixed to the second distal link, and fixedly connected by its proximal end portion to a right actuator, whilst a left proximal intermediate link is fixedly connected by its distal end portion to the left actuator, and a right proximal intermediate link is fixedly connected by its distal end portion to the right actuator. These intermediate links extend in a plane that is substantially perpendicular to the longitudinal axis of the second distal link.

The proximal end portions of the right and left proximal links are respectively fixedly connected to a left proximal pivotal joint and to a right pivotal joint which are pivotally connected to each other by a pivotal transverse proximal link which comprises a lateral portion fixedly connected to a lateral proximal pivotal joint. The lateral proximal pivotal joint is fixedly connected by a perpendicular proximal link to a perpendicular proximal pivotal joint pivotally connected to the cramping device by means of a pivotal orthogonal proximal link. The first distal pivotal joint, at least one of the left proximal pivotal joint and the right pivotal joint, and the perpendicular proximal pivotal joint are lockable joints equipped each with a locking device.

In another embodiment of the invention, in each leg, a first distal link of the leg is fixed to the mobile plate by one of its ends, and by its other end to a lockable first revolute joint the rotation axis of which is perpendicular to the longitudinal axis of the first distal link. The first revolute joint is connected to a revolute second distal joint by a second distal link which is coaxial with the first distal link. The rotating axis of the second distal joint is transverse to the longitudinal axis of the second distal link. The second revolute joint is connected to an actuated prismatic joint by a distal intermediate link which in turn is connected to a lockable third revolute joint by means of a proximal intermediate link. The rotation axis of the third revolute joint is transverse to the longitudinal plane of the proximal intermediate link. The third revolute joint is connected to a lockable fourth revolute joint by a first proximal link in such a manner that the rotation axis of the fourth revolute joint is perpendicular to the rotation axis of the third revolute joint. The fourth revolute joint is connected to a fifth revolute joint by means of a second proximal link such that the rotation axis of the fifth revolute joint is transverse to that of the fourth revolute joint. The rotation axis of the fifth revolute joint is connected to a clamping device by means of a third proximal link.

Preferably, the aforementioned articulated or pivotal joints are revolute joints.

The degrees of freedom of the movement (DOFs) of the manipulator depend on variables listed in the following table:

TABLE 1

| Variables | |
|---|---|
| Structure Variable Symbol | Description |
| $f_k^i$ | DOF of joint k in leg i |
| $j_i$ | number of joints in leg i |
| $n_i$ | number of links in leg i |
| L | number of legs |
| $F^P$ | DOF of the mobile plate |
| $F_i$ | DOF of leg i |
| J | Total number of joints |
| N | Total number of links |
| λ | Integer, 3 for planar & spherical, or 6 for spatial mechanisms |

The mobile plate is controlled by actuators located in legs which are attached to the supporting object. When all legs are attached to the supporting object, the DOFs of the desired manipulation motion of the mobile plate are characterized by the relationship expressed in the following formula:

$$F^P = \lambda(N-J-1) + \Sigma_{i=1}^{L} \Sigma_{k=1}^{j_i} f_k^i$$

According to the present invention, the said legs of mobile manipulators are attached to the supporting object in accordance with a specific supporting pattern. By choosing different groups of clamping targets on the supporting object, the forms and positions of the supporting patterns can be changed. For reconfiguring the mobile manipulator or for achieving locomotion movement, the second ends of certain legs will be relocated. For both the reconfiguration and the locomotion process, the legs which are needed to be relocated will be relocated one by one.

To relocate a leg, for example the Leg x, Leg x will be detached from its clamping target then repositioned and attached to another clamping target.

Detaching Leg x from the supporting object may cause the change of DOF of the mobile plate which is characterized by a relationship that can be calculated by the following formula:

$$F^p = \lambda(N - n_x - J - j_x - 1) + \Sigma_{i=1}^{L} \Sigma_{k=1}^{j_x} f_k^x$$

Also, the total DOFs between the first end and the second end of Leg x can be obtained by the following formula:

$$F_x = \lambda(n_x - j_x - 1) + \Sigma_{k=1}^{j_x} f_k^x$$

To reposition the clamping device of Leg x, the passive DOFs between the detached clamping device and supporting object need to be eliminated, because otherwise the leg would not be controllable. That implies that passive DOFs between the detached clamping device and the mobile plate as well as the passive DOFs between the mobile plate and the supporting object should be eliminated. Locking devices are used to eliminate these passive DOFs. When a joint is locked, the two links linked by the said joint become one rigid link. Also, the locking devices can be spring based devices, so that when the articulated joints are no longer constrained by the closed kinematic chain, the spring devices will maintain the articulated joints at the equilibrium joint position.

In the present invention, one of the plates of the conventional parallel robots is replaced by clamping devices fixed at the end of the legs, able to interface with the support. Also, at least some of the articulated joints are equipped with locking devices. This particular construction allows parallel manipulators to become self-reconfigurable, mobile manipulators.

With the second ends of the legs clamped to clamping targets, the mobile platform can be fixed to manipulation locations and perform like a conventional parallel manipulator. The rigidity during an operation is insured locally by the parallel mechanism, the clamping devices and the supporting object such as floor, fixtures or even a workpiece itself. Locking devices can eliminate the passive DOFs temporally, so that when one of the legs is detached from the supporting object, the second end of the detached leg can be controlled by actuators of the manipulator as a secondary TCP (Tool Center Point). This makes the actuators of manipulator multi-functional. They serve for manipulations, self-reconfigurations and locomotion.

At first glance, the present invention may look like a legged robot of prior art. However, in conventional legged robots, both the human-like biped and animal-like quadruped or hexapod type robots have legs with all their joints being actuated. Three actuators are needed for positioning the pinpoint-type foot to a point in the 3D space where no orientation capacity is required. That is why a typical bio-mimetic quadruped has 12 actuators and a hexapod has 18 actuators. When the orientation of the foot needs to be controlled to fit well the terrain, more than 5 actuators are needed in each leg. It is difficult to consider using this kind of legged robots for manufacturing applications due to their high material cost and the complexity of their control.

In accordance with the invention, the actuators, which may be electric, pneumatic or hydraulic actuators, are connectable to a programmable control means, such as a PLC, ('Programmable Logic Controller') which control the action of the actuators so as to position each of the legs in a predetermined position. Preferably, the locking devices of the lockable joints are also connected to the control means for selectively locking and unlocking the said lockable joints for selectively locking lockable joints to eliminate the degrees of freedom of the locked joints and unlocking lockable joints to restore the degrees of freedom of the unlocked joints, so that the desired positions of the legs can be achieved. In another embodiment, the locking devices may be spring-based locking devices that keep the lockable articulated joints in their equilibrium positions when they are in an open kinematic chain.

Also the clamping means may be connectable to the control means for selectively attaching and detaching each clamping device to and from the clamping targets, so as to clamp the clamping device with the clamping targets to provide a rigid connection with the supporting object and to release the clamping device from the clamping target to allow the clamping device to become movable regarding to the clamping target.

The clamping devices may be clamped to clamping targets such as objects which can be clamped by the clamping devices, areas which can be clamped by the clamping devices, and combinations of such areas and objects, Such objects and areas may be, for example, located on supporting objects such like mobile bases, floors, ceilings in workshops, jigs of workpieces, and workpieces as such.

Many arrangements of these joints could lead to the same result: 6 dof between the mobile plate and the clamping device, some actuated and the others lockable. The joints can be an arrangement of revolute joints, pivotal joints, prismatic joints. The total number of actuated dofs in the manipulator has to be at least 6.

As apparent, the self-configurable manipulator according to this invention serves for operations such as carrying, transporting, positioning and orienting objects or end-effectors carried by the mobile plate. Manipulations are carried out by attaching clamping device of each leg to a supporting object in accordance with a predetermined clamping pattern, unlocking all lockable articulated joints in each leg, and actuating the actuator of each leg so as to relocate and attach one leg after the other in its desired position, Locomotion of the manipulator i.e. moving the manipulator from one working area to another can be achieved by carrying out by repeating the process of relocating of legs as described above in respect of manipulation.

Self-configuration can be achieved by, securing the legs to the supporting object, selectively locking lockable joints in each leg, detaching the clamping device of one leg from the supporting object, controlably actuating each actuator to make the distal end of the detached leg to follow a given trajectory.

As apparent, the invention solves the drawbacks of prior art by providing a resistant and versatile manipulator that is simple in structure and efficient in performance.

BRIEF DESCRIPTION OF THE DRAWINGS

Hereinafter, aspects and embodiments of the invention will be described on the grounds of a hereto appended set of drawings wherein FIG. 1 schematically illustrates a self-reconfigurable mobile manipulator with four legs located on a supporting object.

In these figures, there are reference signs identifying the following elements:

| | |
|---|---|
| 1, 1' | mobile plate (1, 1'), |
| 2 | first distal link |
| 3 | second distal link |
| 4 | distal intermediate link |
| 5, 5a, 5b, 5c, 5d, 5a', 5b', 5c' | clamping devices |
| 6 | supporting object |
| 6a, 6b, 6c, 6d | clamping targets |
| 7, 7a, 7b, 7c, 7d, 7a', 7b', 7c'; 8a, 8b, 8c, 8d, 8a', 8b', 8c' | second revolute joints |
| 9 | proximal intermediate link |
| 10 | first proximal link |
| 11 | second proximal link |
| 12 | third proximal link |
| 21a, 21b, 21c, 21d, 21a', 21b', 21c' | first links |
| 22a, 22b, 22c, 22d, 22a', 22b', 22c' | second links |
| 23a, 23b, 23c, 23d, 23a', 23b', 23c' | third links |
| 24a, 24b, 24c, 24d, 24a', 24b', 24c' | fourth links |
| 25a, 25b, 25c, 25d, 25a', 25b', 25c' | fifth links |
| 26a, 26b, 26c, 26d, 26a', 26b', 26c' | sixth links |
| 27a, 27b, 27c, 27d, 27a', 27b', 27c' | seventh links |
| 28a, 28b, 28c, 28d, 28a', 28b', 28c' | eighth links |
| 29a, 29b, 29c, 29d, 29a', 29b', 29c' | ninth links |
| 31a, 31b, 31b, 32b, 31c, 32c, 31d, 32d; 31a', 32a', 31b', 32b', 31c, 31c' | actuators |
| 41a, 41b, 41c, 41d, 41a', 41b', 41c' | first revolute joints |
| 42a, 42b, 42c, 42d, 42a', 42b', 42c', 45a, 45b, 45c, 45d, 45a', 45b', 45c' | third revolute joints |
| 43, 43a, 43b, 43c, 43d, 43a', 43b', 43c' | fourth revolute joint |
| 44, 44a, 44b, 44c, 44d, 44a', 44b', 44c' | fifth revolute joints |
| P | actuators in the form of prismatic joints |
| P̲ | actuated prismatic joints when actuated |
| R | revolute joints |
| R̲ | actuated revolute joints |
| (R) | joints equipped with a locking device |
| (R̲) | locked revolute joints |

EMBODIMENTS OF THE INVENTION

In view of the above mentioned figures, several possible arrangements of a self-reconfigurable mobile manipulator are disclosed.

Figure 1:
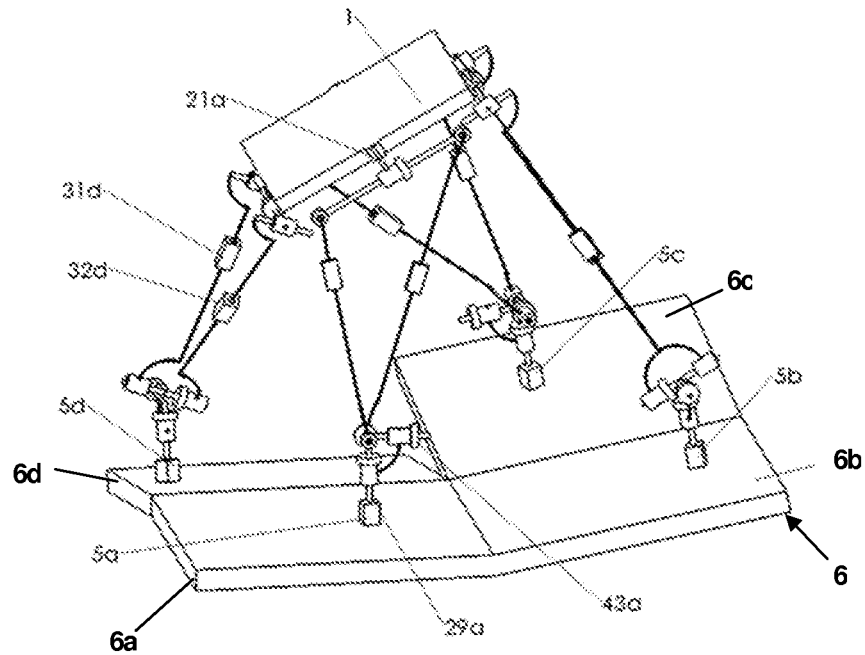
Figure 3:
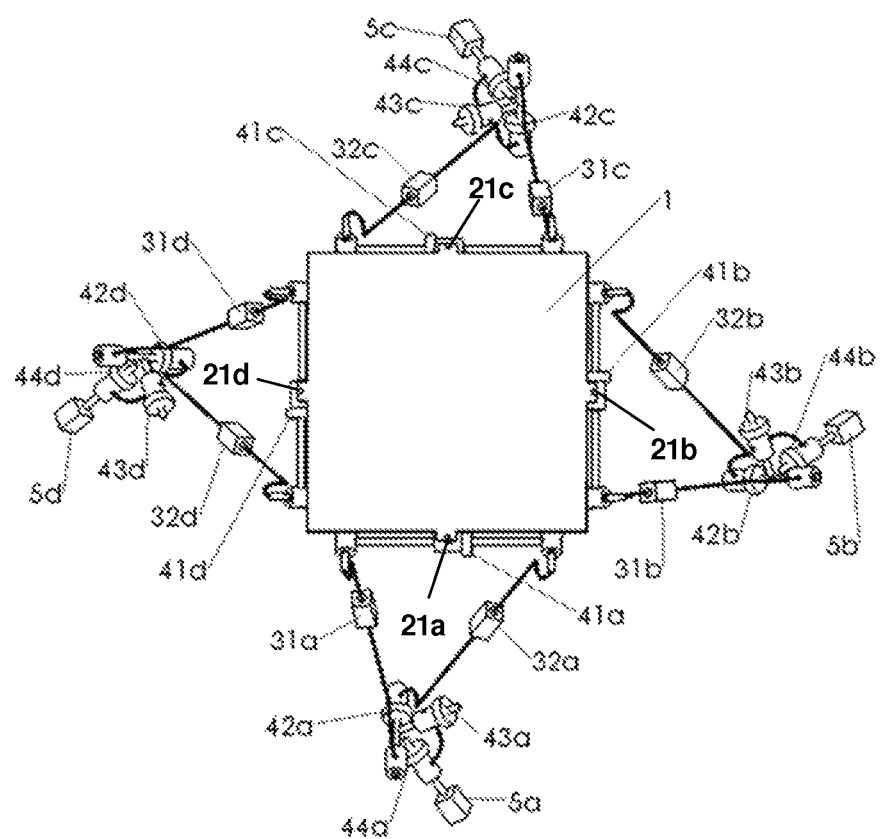
FIG. 3 schematically illustrates a top view of the four legged self-reconfigurable mobile manipulator which is shown in FIG. 1.

FIGS. 1 and 3 are views of a four legged manipulator according to the present invention. Said manipulator comprises a quadrangular mobile plate (1), four legs, four clamping devices (5a, 5b, 5c, 5d), eight actuators (31a, 32a, 31b, 32b, 31c, 32c, 31d, 32d), sixteen revolute joints (41a, 42a, 43a, 44a, 41b, 42b, 43b, 44b, 41c, 42c, 43c, 44c, 41d, 42d, 43d, 44d; 45a, 45b, 45c, 45d) comprising locking devices, and an end-effector. Such end-effector may be fixed directly to the mobile plate (1) or may be fixed to an actuated kinematic chain (not shown in the drawings) which is linked to the mobile plate (1). The final DOFs of the end-effector will be the sum of the DOFs of the mobile plate (1) and the DOFs of the actuated kinematic chain which carries the end-effector. Each of the clamping devices (5a, 5b, 5c, 5d) is clamped to a clamping target (6a, 6b, 6c, 6d) of a supporting object (6).

Figure 2:
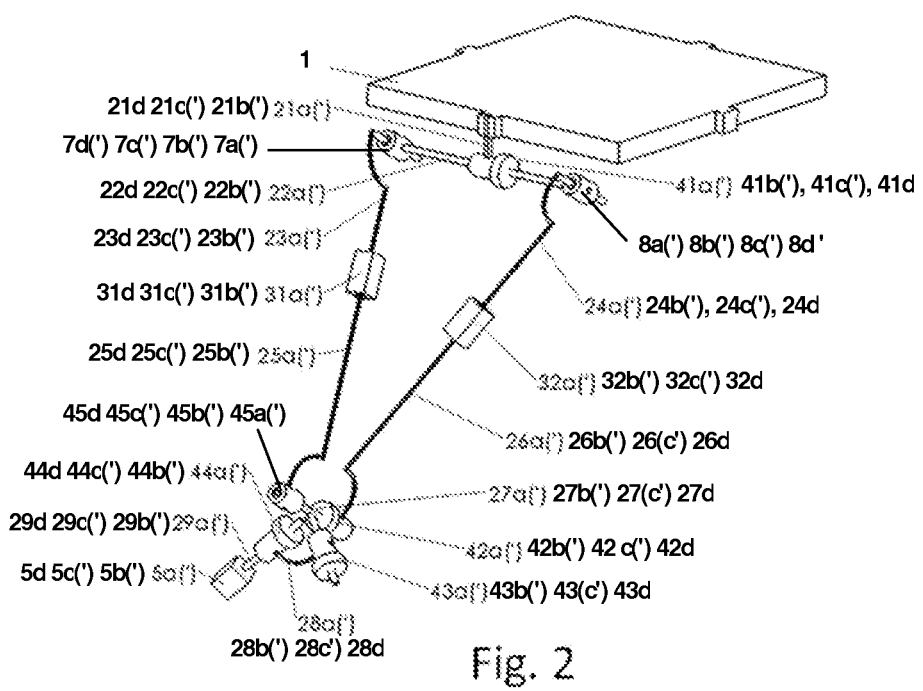
FIG. 2 schematically illustrates the leg structure of the mechanism of FIGS. 1, 3 and 6.
Figure 6:
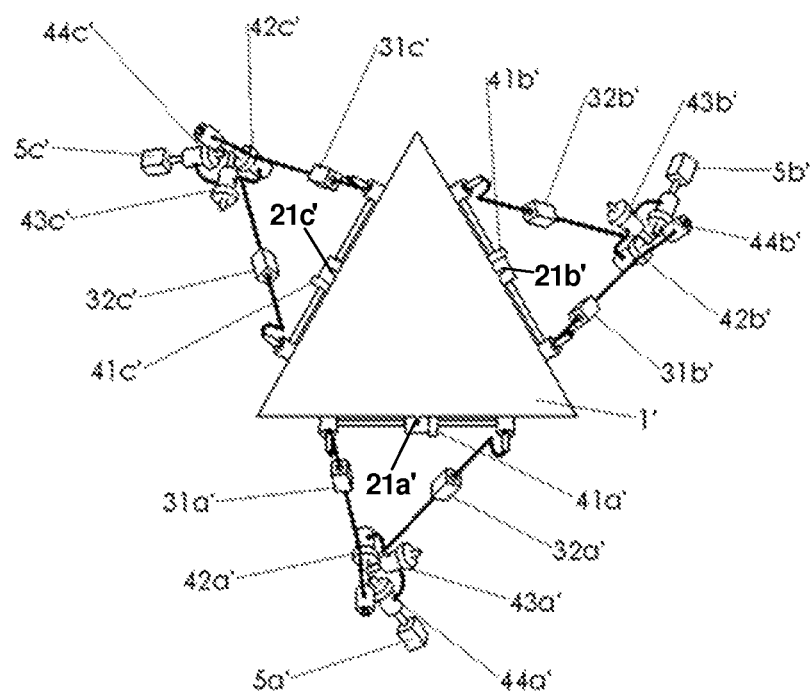
FIG. 6 schematically illustrates a top view of the three legged self-configurable mobile manipulator whose legs structure is shown in FIG. 2.

FIG. 2 shows the structure of a leg of the manipulator according to the present invention which is used in the embodiment shown in FIGS. 1 and 3, and in the embodiment shown in FIG. 6. The first link (21a, 21b, 21c, 21d, 21a', 21b', 21c') of the leg is fixed to the mobile plate (1) by one of its ends. The first end link (21a, 21b, 21c, 21d, 21a', 21b', 21e) is linked by its other end to a second link (22a, 22b, 22c, 22d, 22a', 22b', 22c'), which is transverse to the first link (21a, 21b, 21c, 21d, 21a', 21b', 21c') by a first revolute joint (41a, 41b, 41c, 41d, 41a', 41b', 41c').

The two opposite ends of the second link (22a, 22b, 22c, 22d, 22a', 22b', 22c') are linked respectively with third (23a, 23b, 23c, 23d, 23a', 23b', 23c') and fourth (24a, 24b, 24c, 24d, 24a', 24b', 24c') links respectively by two second revolute joints (7a, 7b, 7c, 7d, 7a', 7b', 7c'; 8a, 8b, 8c, 8d, 8a', 8b', 8c') which are orthogonal to the second link (22a, 22b, 22c, 22d, 22a', 22b', 22c'). The second ends of the third (23a, 23b, 23c, 23d, 23a', 23b', 23c') and fourth (24a, 24b, 24c, 24d, 24a', 24b', 24c') link are linked with a fifth (25a, 25b, 25c, 25d, 25a', 25b', 25c') and sixth (26a, 26b, 26c, 26d, 26a', 26b', 26c') links respectively by actuators in the form of actuated prismatic joints (31a, 31b, 31c, 31d, 31a', 31b', 31e; 32a, 32b, 32c, 32d, 32a', 32b', 32c'). The third, fourth, fifth and sixth links extend in a plane which is substantially perpendicular to the second link (22a, 22b, 22c, 22d, 22a', 22b', 22c').

The second ends of the fifth (25a, 25b, 25c, 25d, 25a', 25b', 25c') and sixth (26a, 26b, 26c, 26d, 26a', 26b', 26c') links are both linked with a transverse seventh link (27a, 27b, 27c, 27d, 27a', 27b', 27c') respectively by means of third revolute joints (42a, 42b, 42c, 42d, 42a', 42b', 42c', 45a, 45b, 45c, 45d, 45a', 45b', 45c'). The mechanism formed by the said first, second, third, fourth, fifth, sixth and seventh links and the said first, second and third joints is a planar mechanism which has three degrees of freedom.

An eighth link (28a, 28b, 28c, 28d, 28a', 28b', 28c') is linked with the seventh link (27a, 27b, 27c, 27d, 27a', 27b', 27c') by a fourth revolute joint (43a, 43b, 43c, 43d, 43a', 43b', 43c') which substantially perpendicular to the seventh link. A ninth link (29a, 29b, 29c, 29d, 29a', 29b', 29c') is linked with the eighth link (28a, 28b, 28c, 28d, 28a', 28b', 28c') by a fifth revolute joint 44a, 44b, 44c, 44d, 44a', 44b', 44c') which is substantially perpendicular to the fourth revolute joint (43a, 43b, 43c, 43d, 43a', 43b', 43c').

The third, fourth and fifth revolute joints which link the fifth, sixth, seventh, eighth and the ninth links intersect at one point which can be considered as the center of an equivalent spherical joint. The clamping device (5a, 5b, 5c, 5d, 5a', 5b', 5d) is fixed at the very end of the ninth link (29a, 29b, 29c, 29d, 29a', 29b', 29e).

With the arrangement shown in FIG. 2, the degrees of freedom between the clamping device (5a, 5b, 5c, 5d, 5a', 5b', 5d) of each leg and the mobile plate (1) is six and two of them are actuated. If the clamping device (5a, 5b, 5c, 5d, 5a', 5b', 5d) of such leg is detached from the clamping target (6a, 6b, 6c, 6d), there will be four passive DOFs corresponding to the first, second, third, fourth, fifth and sixth revolute joints which are equipped with locking devices. By locking the corresponding joints simultaneously, the degrees of freedom between the clamping target and the mobile plate (1) is two so that they can be actuated by the two actuators (31a, 32a, 31a', 32a', 31b, 32b, 31b' 32b', 31c, 32c, 31c' 32c', 31d, 32d) in the detached leg.

Figure 4:
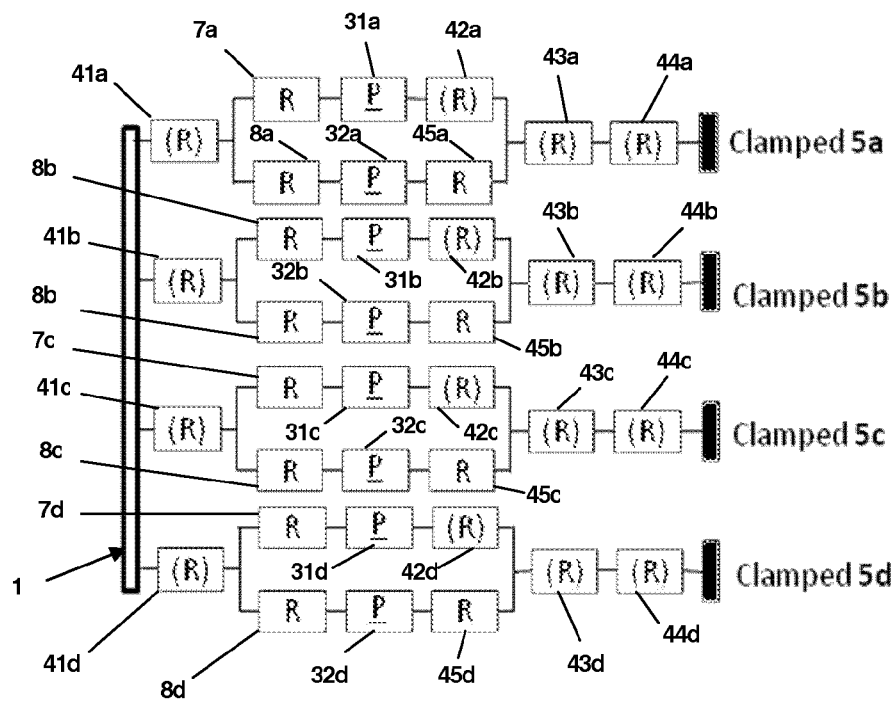
FIG. 4 schematically illustrates the joint and loop graph of the mechanism of FIG. 1 with all four legs located on a supporting object.
Figure 5:
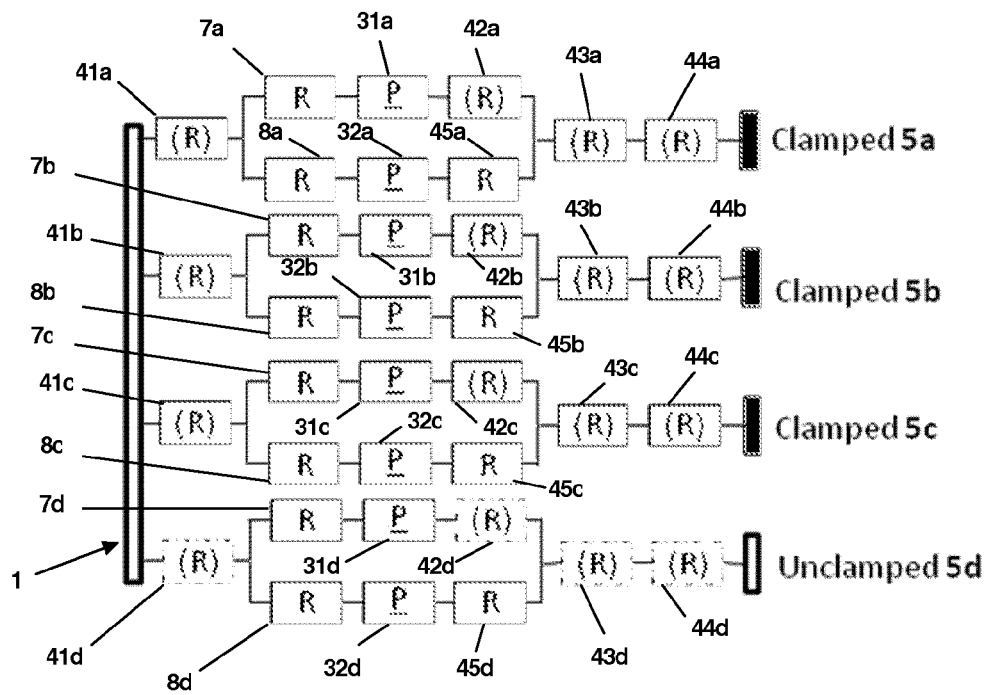
FIG. 5 schematically illustrates the joint and loop graph of the mechanism of FIG. 1 with three legs located on a supporting object and one leg detached from the clamping target.

FIGS. 4 and 5 show joint and loop graphs of the mechanism of FIG. 1, wherein blocks with R and P represent revolute joint and prismatic joint respectively. Joints with underlines, such as R, represent lockable joints. Joints with parentheses, such as (R), represent joints equipped with locking devices. Joints with parentheses in a dashed block, such as (R), represent locked joints.

FIG. 4 shows the joint and loop graph of the mechanism of FIG. 1 with the clamping devices (5a, 5b, 5c, 5d) of all four legs located on clamping targets of a supporting object. The mobile plate (1) has six DOFs which are controlled by eight actuators (31a, 32a, 31b, 32b, 31c, 32c, 31d, 32d).

FIG. 5 shows the joint and loop graph of the mechanism of FIG. 1 with the clamping device (5d) of one of the legs detached from the clamping target. The mobile plate (1) has still six DOFs. These are actuated by six actuators (31a, 32a, 31b, 32b, 31c, 32c) which are located in the attached legs. Meanwhile, in the detached leg, several locking devices are activated for locking the corresponding revolute joints (41d, 42d, 43d, 44d) which are represented as dashed blocks in FIG. 5, so that there are only two DOFs left between the detached clamping device (5d) and the mobile plate (1'), which are actuated by two actuators (31d, 32d) in the detached leg.

FIG. 6 shows a self-reconfigurable mobile manipulator with three legs each of having a structure corresponding to what has been described herein above with reference to FIG. 2, mounted to a triangular mobile plate (1').

Figure 7:
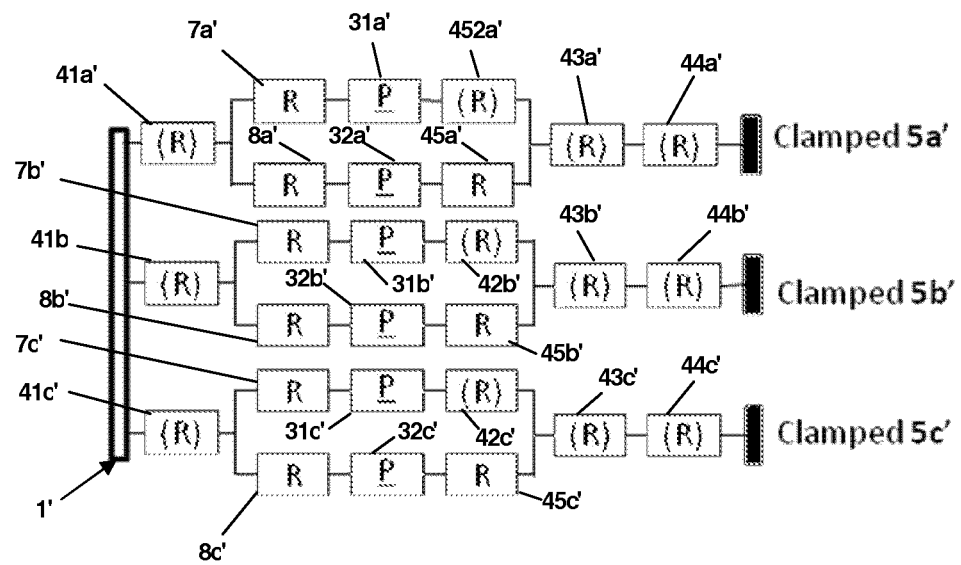
FIG. 7 schematically illustrates the joint and loop graph of the mechanism of FIG. 6 with all three legs located on a supporting object.
Figure 8:
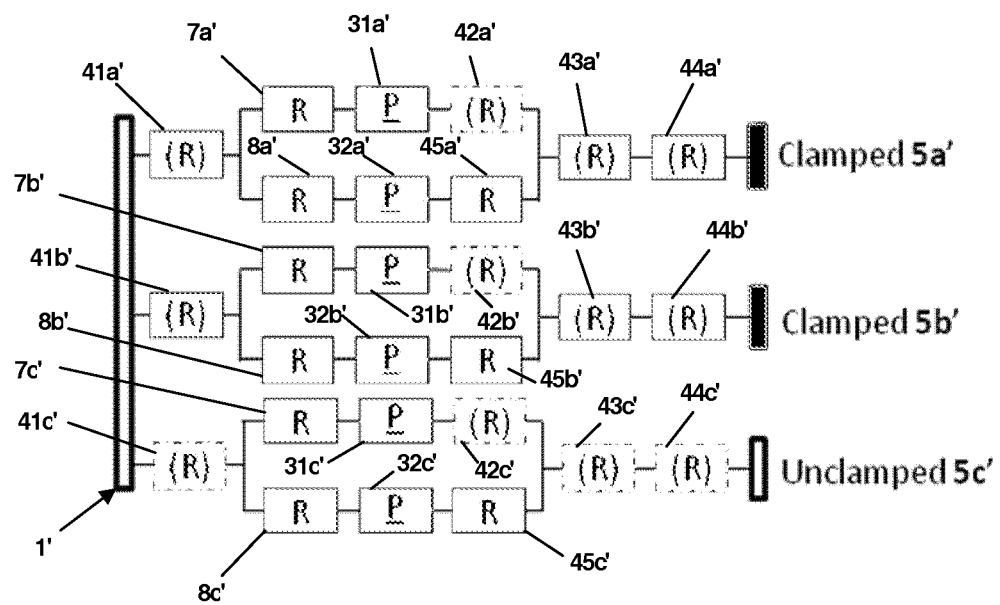
FIG. 8 schematically illustrates the joint and loop graph of the mechanism of FIG. 6 with two legs located on a supporting object and one leg detached from the clamping target.

FIGS. 7 and 8 show joint and loop graphs of the mechanism of FIG. 6, wherein again blocks with R and P represent revolute joint and prismatic joint respectively. Joints with underlines, such as R, represent lockable joints. Joints with parentheses, such as (R), represent joints equipped with locking devices. Joints with parentheses in a dashed block, such as (R), represent locked joints.

As shown in FIG. 7, with all legs attached to the supporting object, the mobile plate (1') of the three legged manipulator has six DOFs which are controlled by six actuators (31a', 32a', 32b', 31b', 31e, 32c'). When detaching the clamping device (5c') of one of the legs from the clamping target, as shown in FIG. 8, the passive DOFs in the detached leg should be locked for the same reason as explained previously with reference to FIG. 5. However, the two passive DOFs of the mobile plate (1) will be eliminated temporally by locking one locking device (42a', 42b') in each clamped leg, so that the four remaining DOFs of mobile plate can be controlled by actuators (31a', 32a', 31b', 32b') located in attached legs.

Figure 9:
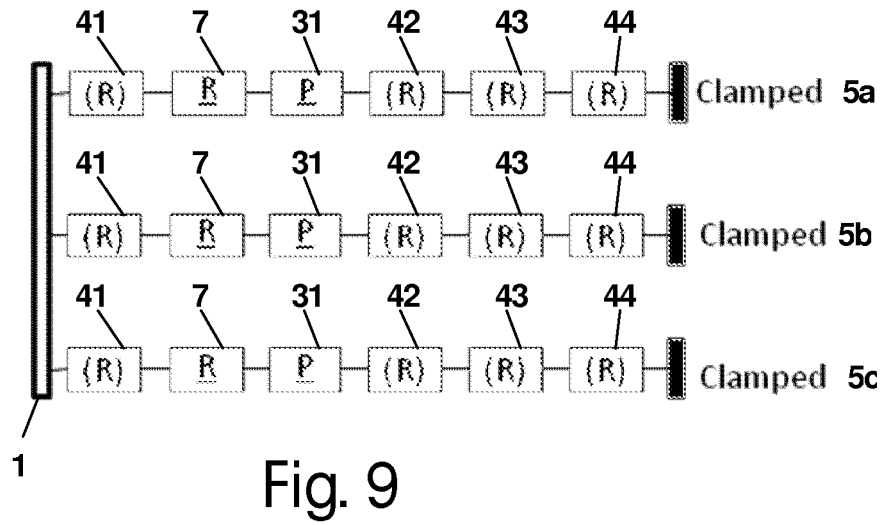
FIG. 9 schematically illustrates the joint and loop graph of another possible arrangement of a three legged self-reconfigurable mobile manipulator with all three legs located on a supporting object.
Figure 10:
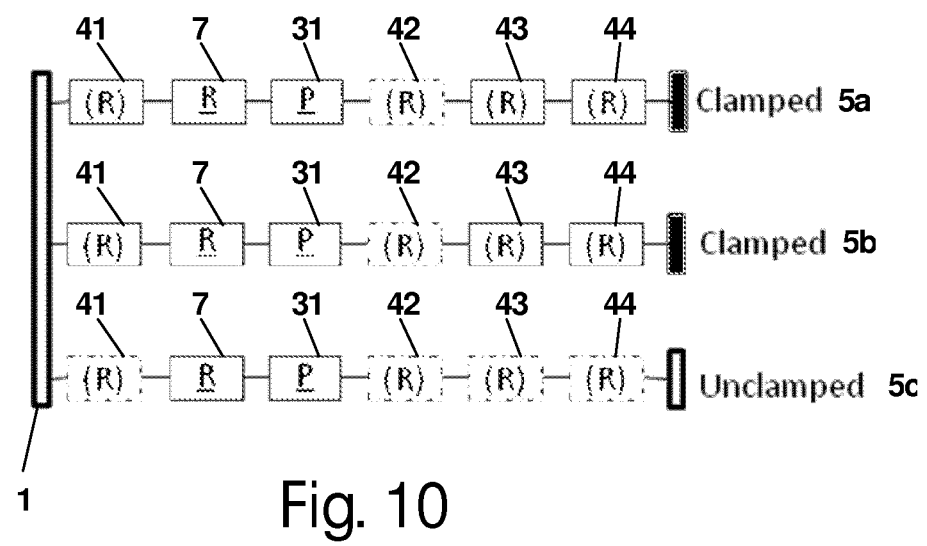
FIG. 10 schematically illustrates the joints and loop graph of the some three legged self-reconfigurable mobile manipulator with two legs located on a supporting object and one leg detached from the clamping target.
Figure 11:
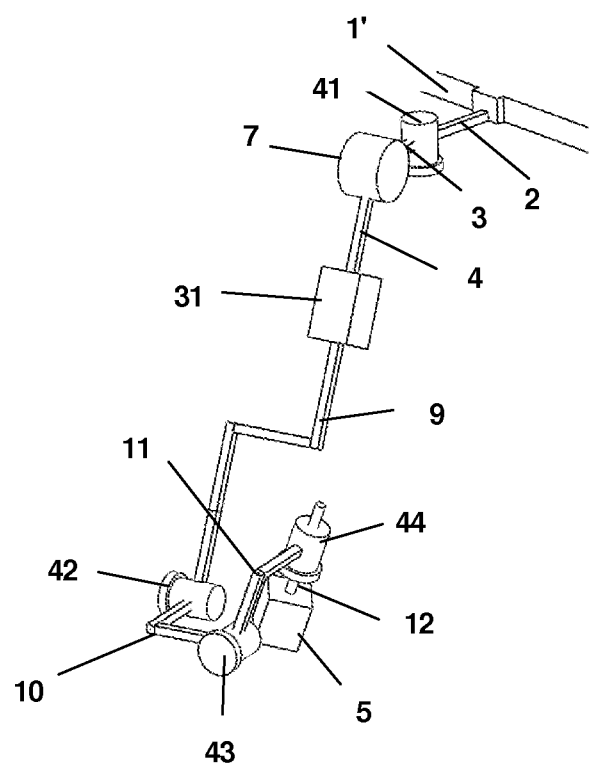
FIG. 11 schematically illustrates a leg structure of the mechanism usable in the arrangement of the mobile manipulator shown in FIGS. 9 and 10.

FIGS. 9 and 10 show the joint and loop graph of another possible leg arrangement for building self-reconfigurable mobile manipulators comprising three legs having a serial architecture, each leg having a structure as shown, for example in FIG. 11.

In the embodiment shown in FIG. 11, a first distal link (2) of the leg is fixed to the mobile plate (1') by one of its ends, and by its other end to a lockable first revolute joint (41) the rotation axis of which is perpendicular to the longitudinal axis of the first distal link (2). The first revolute joint (41) is connected to a revolute second distal joint (7) by a second distal link (3) which is coaxial with the first distal link (2). The rotating axis of the second distal joint is transverse to the longitudinal axis' of the second distal link (3).

The second revolute joint (7) is connected to an actuated prismatic joint (31) by a distal intermediate link (4) which in turn is connected to a lockable third revolute joint (42) by means of a proximal intermediate link (9). The rotation axis of the third revolute joint (42) is transverse to the longitudinal plane of the proximal intermediate link (9). The third revolute joint (42) is connected to a lockable fourth revolute joint (43) by a first proximal link (10) in such a manner that the rotation axis of the fourth revolute joint (43) is perpendicular to the rotation axis of the third revolute joint (42). The fourth revolute joint (43) is connected to a fifth revolute joint (44) by means of a second proximal link (11) such that the rotation axis of the fifth revolute joint (44) is transverse to that of the fourth revolute joint (43). The rotation axis of the fifth revolute joint (44) is connected to a clamping device (5) by means of a third proximal link (12).

FIGS. 9 and 10 show joint and loop graphs of the mechanism of FIG. 6 with legs as shown in FIG. 11, wherein again blocks with R and P represent revolute joint and prismatic joint respectively. Joints with underlines, such as R, represent lockable joints. Joints with parentheses, such as (R), represent joints equipped with locking devices. Joints with parentheses in a dashed block, such as (R), represent locked joints.

As shown in FIG. 9, with all legs attached to the supporting object, the mobile plate (1') of the three legged manipulator has six DOFs which are controlled by six actuators (31). When detaching the clamping device (5) of one of the legs from the clamping target, as shown in FIG. 10, the passive DOFs in the detached leg should be locked for the same reason as explained previously with reference to FIG. 9. However, the two passive DOFs of the mobile plate (1') will be eliminated temporally by locking one locking device (42) in each clamped leg, so that the four remaining DOFs of mobile plate can be controlled by actuators (31) located in attached legs.

In view of this description and set of drawings, a person skilled in the art will understand that the embodiments of the invention that have been described can be combined in many ways within the object of the invention. The invention has been described according to a preferred embodiment thereof, but it will be evident for a person skilled in the art that many variations can be introduced in said preferred embodiments without exceeding the scope of the claimed invention.

The invention claimed is:

1. A mobile manipulator which is able to achieve manipulation, self-reconfiguration and locomotion movement, comprising a mobile plate suitable for carrying an object, and a plurality of legs each having a distal end connected to the said mobile plate and a proximal end connected to a support; each leg comprising at least one actuator interconnected between said mobile plate and the supporting object; wherein each leg comprises a plurality of links, and is connectable to a clamping device at its proximal end for connecting the leg to the support which is a clamping area of a supporting object;

each actuator is interconnected between respective proximal end portions of a distal intermediate link and respective distal end portions of a proximal intermediate link, said distal intermediate link comprising distal end portions articulatedly connected to the mobile plate through at least one distal articulated joint and said proximal intermediate link comprising proximal end portions articulatedly connected to one of the clamping devices through at least one proximal articulated joint;

said articulated joints comprise a distal lockable joint system arranged between said actuator and said mobile plate, and a proximal lockable joint system arranged between said actuator and said clamping device; said lockable joint systems being arranged to immobilize the leg in predetermined positions achieved by action of said actuators.

2. A manipulator according to claim 1 wherein said clamping device is selected according to the clamping targets.

3. A manipulator according to claim 2, wherein the clamping device comprises at least one of mechanical clamping devices, vacuum clamping systems and electromagnetic clamping systems.

4. A manipulator according to claim 1 wherein said clamping targets comprise at least one of objects which can be clamped by the clamping devices, areas which can be clamped by the clamping device, and combinations thereof.

5. A manipulator according to claim 4, wherein said supporting object comprises at least one of mobile bases, floors, ceilings in workshops, jigs of workpieces, and workpieces as such.

6. A manipulator according to claim 1, wherein each actuator is controlled by control means for actuation.

7. A manipulator according to claim 6, wherein said spring based devices keep the lockable articulated joints at their equilibrium positions when they are in an open kinematic chain.

8. A manipulator according to claim 1, wherein said locking devices comprise at least one of lockers and spring based devices.

9. A manipulator according to claim 8, wherein said lockers are connected to control means for selectively locking and unlocking the said articulated joints, for selectively locking lockable joints to eliminate the degrees of freedom of the locked joints and unlocking lockable joints to restore the degrees of freedom of the unlocked joints.

10. A manipulator according to claim 1, wherein said object carried by said mobile plate is at least one end-effector with articulated or unarticulated kinematic chain.

11. A manipulator according to claim 10, wherein said end-effector comprises at least one of tools for measuring, inspecting, painting, shape forming, assembling and other manufacturing processes as required.

12. A manipulator according to claim 1, wherein it comprises at least three legs.

13. A manipulator according to claim 12, wherein the distal end of each leg is fixed to a side portion of the mobile plate.

14. A manipulator according to claim 1, wherein said articulated joints are selected from pivotal and revolute joints.

15. A manipulator according to claim 1, wherein in each leg
a first distal link is fixedly connected by its distal end to the mobile plate and by its proximal end to a first distal pivotal joint located on an intermediate portion of a pivotal second distal link which is transverse to the first distal link;
a left distal intermediate link is pivotally connected by its distal end portion to a left end portion of the second distal link by means of a left distal pivotal joint fixed to the second distal link, and fixedly connected by its proximal end portion to a left actuator;
a right distal intermediate link is pivotally connected by its distal end portion to a right end portion of the second distal link by means of a right distal pivotal joint fixed to the second distal link, and fixedly connected by its proximal end portion to a right actuator;
a left proximal intermediate link is fixedly connected by its distal end portion to the left actuator, and a right proximal intermediate link is fixedly connected by its distal end portion to the right actuator;
said intermediate links extend in a plane that is substantially perpendicular to the axis of said second distal link;
the proximal end portions of the right and left proximal links are respectively fixedly connected to a left proximal pivotal joint and to a right pivotal joint, which are pivotally connected to each other by a pivotal transverse proximal link which comprises a lateral portion fixedly connected to a lateral proximal pivotal joint;
the lateral proximal pivotal joint is fixedly connected by a perpendicular proximal link to a perpendicular proximal pivotal joint pivotally connected to the clamping device by means of a pivotal orthogonal proximal link;
the first distal pivotal joint, at least one of said left proximal pivotal joint and said right pivotal joint, and said perpendicular proximal pivotal joint are lockable joints equipped each with a locking device.

16. A manipulator according to claim 1, wherein in each leg
a first distal link of the leg is fixed to the mobile plate by one of its ends, and by its other end to a lockable first revolute joint the rotation axis of which is perpendicular to the longitudinal axis of the first distal link;
the first revolute joint is connected to a revolute second distal joint by a second distal link which is coaxial with the first distal link, the rotating axis of the second distal joint being transverse to the longitudinal axis of the second distal link;
the second revolute joint is connected to an actuated prismatic joint by a distal intermediate link which is connected to a lockable third revolute joint by means of a proximal intermediate link such that the rotation axis of the third revolute joint is transverse to the longitudinal plane of the proximal intermediate link;
the third revolute joint is connected to a lockable fourth revolute joint by a first proximal link such that the rotation axis of the fourth revolute joint is perpendicular to the rotation axis of the third revolute joint;
the fourth revolute joint is connected to a fifth revolute joint by means of a second proximal link such that the rotation axis of the fifth revolute joint is transverse to that of the fourth revolute joint; and
the rotation axis of the fifth revolute joint is connected to a clamping device by means of a third proximal link.

17. A manipulator according to claim 1, wherein said clamping devices are connected to control means for selectively attaching and detaching each clamping device to and from the clamping targets, so as to clamp the clamping device with the clamping targets to provide a rigid connection with the supporting object and to release the clamping device from the clamping target to allow the clamping device to become movable regarding to the clamping target.

* * * * *